United States Patent Office 3,618,228
Patented Nov. 9, 1971

3,618,228
QUESTIONEE'S RESPONSE DETECTION AND COMMUNICATION
Masami Koizumi, Kawasaki-shi, Japan, assignor to Kabushiki Kaisha Ricoh, Tokyo, Japan
Filed Aug. 19, 1969, Ser. No. 851,329
Claims priority, application Japan, Aug. 24, 1968, 43/60,802
Int. Cl. G09b 7/02
U.S. Cl. 35—9 R                3 Claims

ABSTRACT OF THE DISCLOSURE

A questionee's response detection and communication system wherein a device for displaying and/or recording the response of each of the questionees is electrically connected to a questionee's response selection switch consisting of a pair of rectifier elements connected in back-to-back relation and a selection switch for selecting either of said rectifier elements and to a polarity change-over switch which is adapted to be selectively connected to a DC source and to change over the polarity thereof. AC may be selectively passed through a circuit in which a transmitter on the side of said polarity change-over switch is electrically coupled to a receiver provided for each of said questionee's response selection switches.

BACKGROUND OF THE INVENTION

The present invention relates to a questionee's response detection and communication system and more particularly to a response detection and communication system by which the responses of each of the questionees to a questioner may be detected and the communication between the questionees and the questioner may be established.

In teaching machines, it is often desired to display simultaneously the responses of all of the questionees or students to a question from a questioner or teacher. In this case, for example, lamps equal in number with that of the questionees are provided and turned on or off by the respective questionees in response to their answer for example "YES" or "NO," thereby displaying the responses of the questionees. In the conventional system as described above, the display of the response is limited to either of YES or NO. There will be then no problem when the answer is limited to YES or NO only, but when the correct answer is both YES and NO or when it is desired to distinguish those who answer YES or NO from those who give no answer at all, the conventional system cannot display both of the answers YES and NO or distinguish those who answer from those who give no answer at all. In view of the above, the inventor has proposed a novel questionee's response detection and communication system which can eliminate the disadvantage as described above and establish the communication between the questioner and those who give the correct answer or wrong answer.

This will be described in detail for better understanding of the present invention with reference to FIG. 1. Referring to FIG. 1, which is prior art known only to the applicant the lamps $L_1$, $L_2$ and so on are provided one for each questionee or student and are connected electrically to the respective questionee's response selection switch $S_1$, $S_2$ and so on consisting of a pair of rectifier elements $d_1$ and $d_2$ connected in back-to-back relation and a selection switch $s$ for selecting either of the pair of rectifier elements $d_1$ and $d_2$ and to a polarity change-over switch S consisting of a pair of interlocked switches $s_{11}$ and $s_{22}$ and being connected to a DC source. A transmitter T on the side of the polarity change-over switch S is coupled to respective receivers $R_1$, $R_2$ and so on for respective questionee's response selection switches. In this system when each of the questionees switches his switch $s$ in his response selection switch for example $S_1$ so as to select either of the rectifier elements $d_1$ or $d_2$ and when the selected rectifier element is forward-directed relative to the current supplied from the DC source throughout the polarity change-over switch S, the lamp $L_1$ will be turned on and the communication with the questioner may be established. On the other hand, when the selected rectifier is reverse-directed, no current flows so that the lamp will not be turned on and the communication will not be established. When the switch S is switched to change the polarity of the current passing through the system from the DC source, it will be readily seen that the lamp which has not been turned on will be turned on while the lamp which has been turned on will be turned off. The same is true for the communication. Thus, it will be readily seen that the system described above is very convenient for displaying both of the answers YES and NO and consequently for dividing the questionees into two groups, one for those who answered YES and the other for those who answered NO. Moreover, the communication between the questioner and the questionees may be established. In this case, it must be noted that the communication is established conveniently between the questioner and either of those who answer YES or those who answer NO. However, this communication system has still some disadvantages when applied to the language laboratories or the like where the simultaneous communication between the teacher and the students whether they answer YES or NO is desired.

The primary object of the present invention is to provide a system for establishing the simultaneous communication between a questioner or teacher and all of the questionees or students in the questionee's response detection and communication system described with reference to FIG. 1, thereby making the system best suited for use in the language laboratories or the like without any inconvenience.

SUMMARY OF THE INVENTION

In brief, the present invention provides a questionee's response detection and communication system in which a device for displaying and/or recording the response of each of the questionees is provided and connected to a questionee's response selection switch consisting of a pair of rectifier elements connected in back-to-back relation and a selection switch for selecting either of the pair of rectifier elements depending upon the questionee's response or answer and to a polarity change-over switch connected selectively to a DC source and adapted to change over the polarity of the current passing through the system; and AC is selectively passed through the circuit in which a transmitter on the side of the polarity change-over switch is connected to the respective receivers of the questionee's response selection switches.

When the high frequency current is passed through the system circuit as described above, the high frequency current may be passed through the rectifiers alternately at each half cycle of the current so that the communication between the questioner and the questionees whether they answer YES or NO may be established.

According to the present invention, it is not necessary to increase the number of circuits between the questioner and the questionees for establishing the simultaneous communication in an economical and simple manner without adversely affecting the features offered by the system illustrated in FIG. 1 so that it will be understood that the system of the present invention is best suited as a teaching machine system in the language laboratory or in any other institute.

3,618,228

DESCRIPTION OF THE PREFERRED EMBODIMENTS

Figure 2:
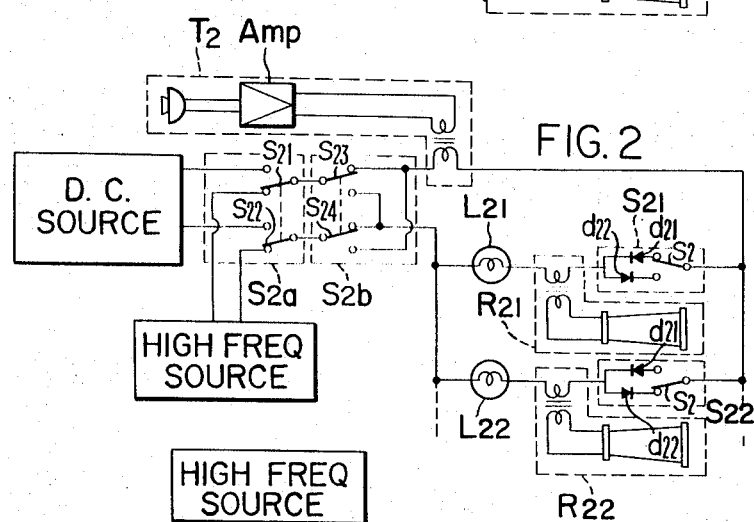
FIGS. 2 and 3 are circuit diagrams illustrating the embodiments of the present invention respectively.

Referring to FIG. 2, each of lamps $L_{21}$, $L_{22}$ and so on, one for each questionee, is connected to a questionee's response selection switch $S_{21}$, $S_{22}$ and so on respectively and to a polarity change-over switch $S_{2b}$ consisting of selection switches $s_{23}$ and $s_{24}$ for changing the polarity of a DC source in cooperation with a power source change-over switch $S_{2a}$ consisting of selection switch $s_{21}$ and $s_{22}$ for changing over from the DC source to a high frequency source or vice versa. Between the polarity change-over switch $S_{2b}$ and each of the questionees' response selection switches $S_{21}$, $S_{22}$ and so on, a transmitter $T_2$ is coupled to each of receivers $R_{21}$, $R_{22}$ and so on.

Figure 1:
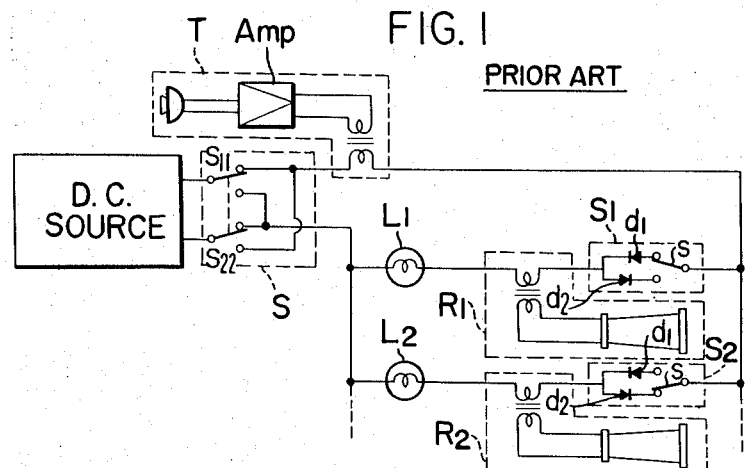
FIG. 1 is a circuit diagram illustrating one prior art system proposed by the inventor.

The function of the whole circuits when the switch $S_{2a}$ is closed to the DC source is similar to that described with reference to FIG. 1. When each of the questionees switches the movable contact $S_2$ to close either of the contacts $s_{21}$ or $s_{22}$ so as to select either of the rectifier elements $d_{21}$ or $d_{22}$ and when the selected rectifier element is forward-directed (that is when the rectifier element passes the current) the lamp is turned on and the communication with a questioner is established. When the switch $S_{2b}$ is switched in this state, the rectifier element which is forward-directed becomes reverse-directed while the rectifier element which is reverse-directed will become forward-directed so that the lamp is turned on by the current passing through the forward-directed rectifier element and the communication is also established. When the switch $S_{2a}$ is switched to the high frequency source, the current passes through the rectifier elements $d_{21}$ and $d_{22}$ alternately at each half cycle of the high frequency current so that the audio signals from the questioner may be transmitted to all of the questionees without any distortion. That is, the simultaneous communication between the transmitter $T_2$ and the receivers $R_{21}$, $R_{22}$ and so on may be established. The AC of the order of 20,000 to 100,000 Hz. is used as the above high frequency source. That is, any AC may be used as far as this current may reduce the internal resistance of the rectifier element. The transmission level of the audio signal may be varied when the DC source is changed over to the high frequency source or vice versa, but this problem will be solved easily by providing a level change-over or control switch (not shown).

The lamps $L_{21}$, $L_{22}$ and so on are for indication of the responses of the questionees, but it will be readily understood that they may be replaced with a suitable recording or display-recording device as needs demand while the above transmitter $T_2$ and the receivers $R_{21}$, $R_{22}$ and so on may be replaced with suitable transmitter-receivers.

Figure 3:
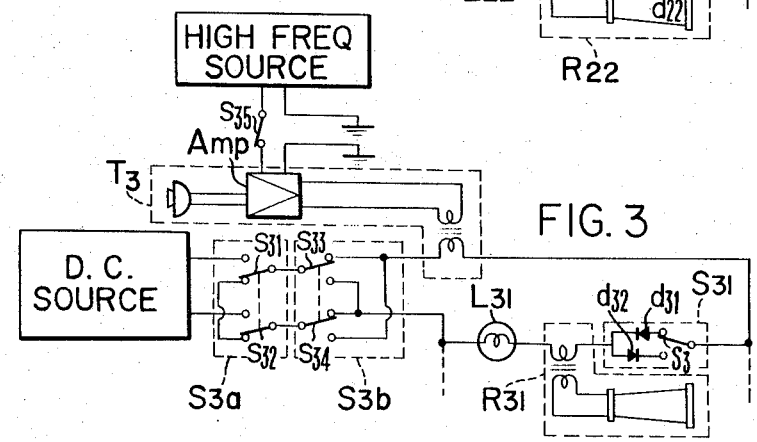

FIG. 3 illustrates another embodiment of the present invention in which the high frequency source is coupled to an amplifier Amp. It will be readily seen that the high frequency source may be connected to any suitable stage of the whole system. In case of this embodiment illustrated in FIG. 3, a switch $S_{35}$ is opened when the high frequency source is not utilized. In FIG. 3, reference characters $L_{31}$ and so on designate the lamps; $S_{31}$ and so on, the questionees' response selection switches consisting of a pair of rectifier elements $d_{31}$ and $d_{32}$ connected in back-to-back relation and a switch $S_3$ for selecting either of these rectifier elements according to the response or answer of the questionee; and $S_{3b}$, a polarity change-over switch consisting of switches $s_{33}$ and $s_{34}$. Reference character $T_3$ designates a transmitter while $R_{31}$ and so on, receivers respectively. The function of the system shown in FIG. 3 is similar to that described hereinabove with reference to FIG. 2.

What is claimed is:

1. A questionee's response detecting device for YES, NO and NO RESPONSE answers including a main circuit comprising:

a DC power source;

an AC power source;

a questioner's change-over switch means having a plurality of selectable pairs of terminals therein;

a power source change-over switch having a plurality of selectable pairs of terminals therein, a first pair of said terminals of said power source change-over switch connected to a first pair of said terminals of said questioner's change-over switch;

a first pair of leads connecting a second pair of said terminals of said power source change-over switch to said DC power source, said first pair of leads having current flowing therein in a predetermined direction when said main circuit is energized;

a second pair of leads connecting a third pair of said terminals of said power source change-over switch to said AC power source;

questionee answer selection circuit means;

a third pair of leads connected respectively to second and third pairs of terminals of said questioner's switch means and connecting said questioner's switch means in series with said questionee circuit means to complete said main circuit whereby current selectively flows in either one or the opposite direction through said second pair of leads and said questionee circuit means when said DC source is connected to said power source switch and whereby alternating current flows through said second or third pair of leads when said AC source is connected to said power source switch;

said questioner's switch means comprising a double throw switch having two elements movable in unison and selectively connecting said first pair of terminals thereof with said second or third pairs of terminals thereof, alternatively;

said power source switch means comprising a double-throw switch having two elements movable in unison and selectively connecting said first pair of terminals thereof with said second or third pairs of terminals thereof, alternatively;

said questionee circuit means comprising a plurality of selection circuits each connected between said third pair of leads and connected in parallel with each other; each selection circuit comprising a series connection of an energizable lamp, an audio receiving means and a selection switch means, said selection switch means comprising a pair of rectifiers connected in parallel with each other and each adapted to pass current in an opposite direction with respect to each other, each of said rectifiers being connected to a contact, and a switch element being selectively movable to one of said contacts to allow current to pass through one of said rectifiers in its respective direction; and audio transmitting means connected to one of said second pair of leads and transformer coupled to said audio receiving means to send a signal thereto when the main circuit is energized and when said AC source is connected with said power source switch;

said double throw switch of said questioner's switch means selectively positioned at one of said second and third pairs of terminals to determine the current flow in one of the directions through said second pair of leads and questionee switch means when said DC source is connected with said power source switch, said current flow provided in said main circuit by selectively positioning said questionee switch element at one of said contacts to allow current to flow through one of said rectifiers in the same one direction thereby indicating one of the YES and NO answers and simultaneous energizing said lamp and said audio receiving means, said questionee switch element selectively positionable between said contacts to prevent current flow in the main circuit whereby the lamp is deenergized indicating a NO RESPONSE answer, and alternating current flow being provided through said rectifiers energizing said lamp and said audio receiving means when said AC source is connected with said power source switch.

2. A device as set forth in claim 1, wherein said AC power source is at a high frequency.

3. A device as set forth in claim 2, wherein said high frequency is in the range of 20,000 to 100,000 Hz.

References Cited

FOREIGN PATENTS 61,137  4/1968  Germany.

ROBERT W. MICHELL, Primary Examiner

J. H. WOLFF, Assistant Examiner